Feb. 23, 1943.   C. B. MOORE   2,311,853
FLUID OPERATED APPARATUS
Filed Nov. 5, 1937   4 Sheets—Sheet 1
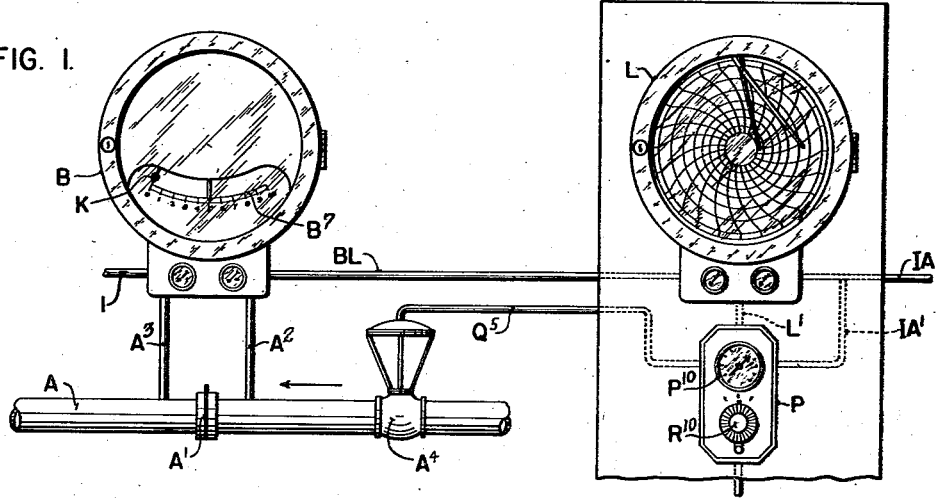
FIG. 1.
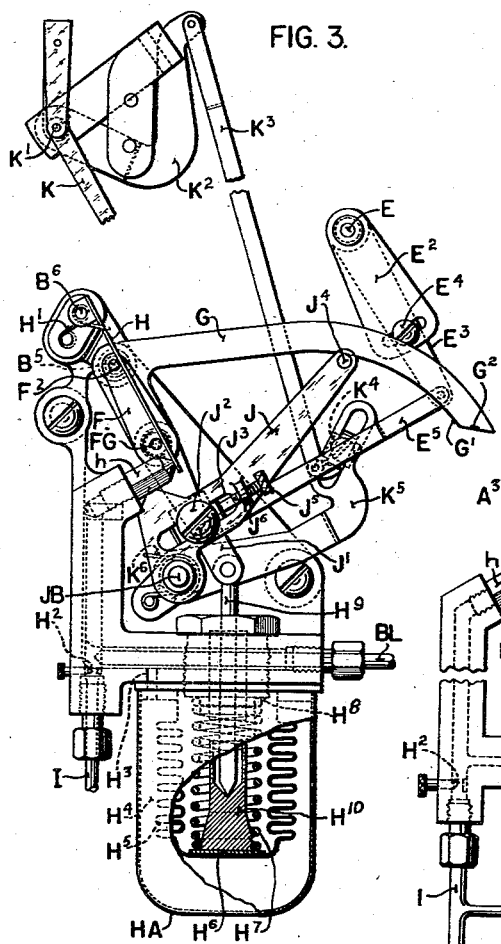
FIG. 3.
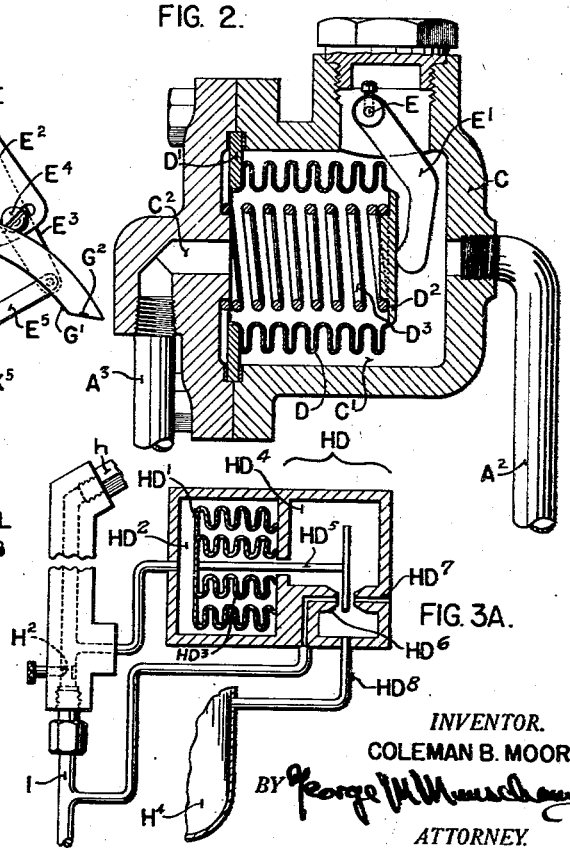
FIG. 2.
FIG. 3A.
INVENTOR.
COLEMAN B. MOORE
BY George W. Meuerkamp
ATTORNEY.

Feb. 23, 1943.                C. B. MOORE                    2,311,853
                        FLUID OPERATED APPARATUS
              Filed Nov. 5, 1937                4 Sheets-Sheet 2
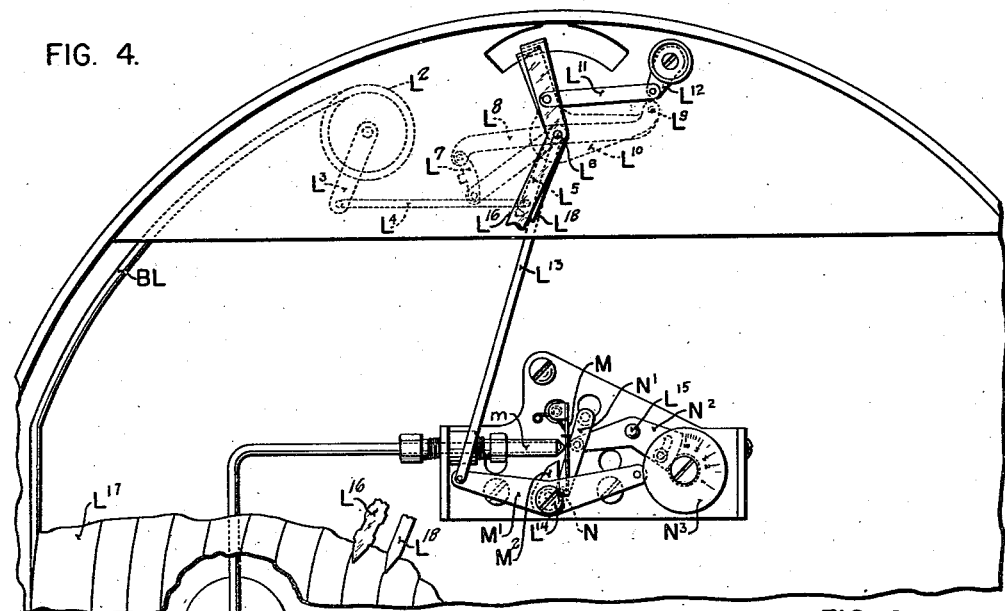
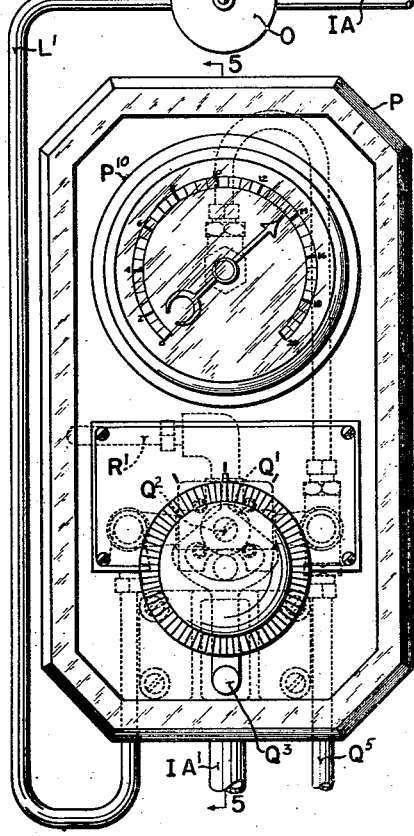
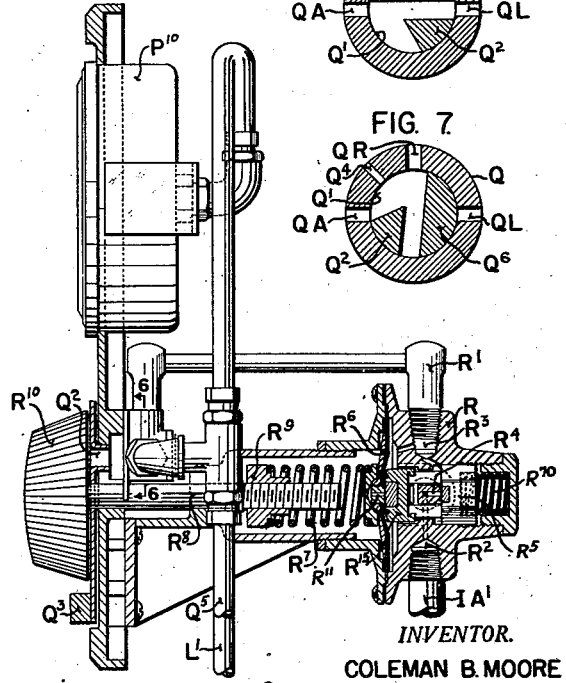
INVENTOR.
COLEMAN B. MOORE
BY
ATTORNEY.

Feb. 23, 1943.　　　C. B. MOORE　　　2,311,853
FLUID OPERATED APPARATUS
Filed Nov. 5, 1937　　　4 Sheets-Sheet 3
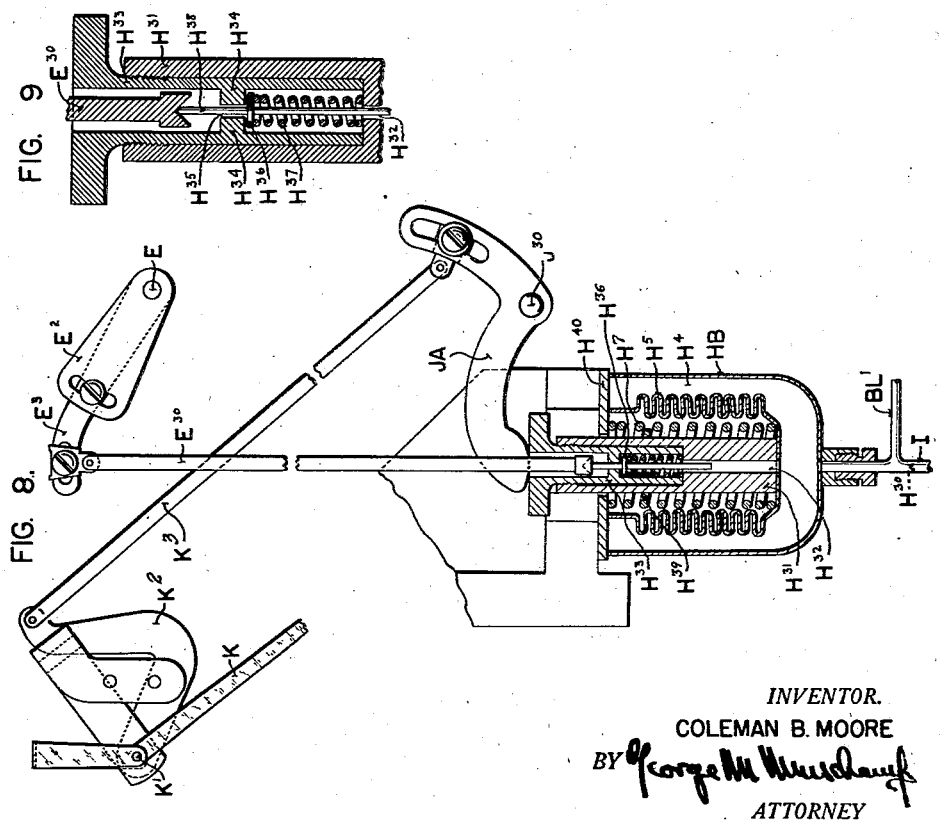
INVENTOR.
COLEMAN B. MOORE
BY
ATTORNEY Feb. 23, 1943.   C. B. MOORE   2,311,853
FLUID OPERATED APPARATUS
Filed Nov. 5, 1937   4 Sheets-Sheet 4

INVENTOR.
COLEMAN B. MOORE
BY
ATTORNEY

Patented Feb. 23, 1943

2,311,853

UNITED STATES PATENT OFFICE 2,311,853

FLUID OPERATED APPARATUS

Coleman B. Moore, Carroll Park, Pa., assignor to The Brown Instrument Company, Philadelphia, Pa., a corporation of Pennsylvania Application November 5, 1937, Serial No. 173,008

22 Claims. (Cl. 73—205)

The general object of the present invention is to provide improved measuring apparatus of the type comprising measuring means adapted to create a force which varies in accordance with a quantity measured and which is transmitted to a distance to actuate a remote exhibiting instrument or control device. More specifically, the object of the invention is to provide improved telemetric apparatus comprising a primary measuring means, or transmitter, adapted to create an air pressure which varies with the quantity measured and which is transmitted by piping to a remote receiver, measuring said pressure to be actuated by said pressure, and in some cases, creating control effects proportional to said pressure.

By using air under pressure as the medium for transmitting force from the transmitter to the receiver, I avoid the explosion risk which exists when the transmitter and receiver are connected by electric circuit conductors and the apparatus is used in oil refineries and in other industrial plants in which an electric spark may give rise to an explosion. The use of compressed air as the transmitting force is advantageous also in that the pressure transmitting effect of the air is practically independent of temperatures, and because in most plants in which such apparatus may be used with advantage, there will ordinarily be an available source of compressed air supplied for other purposes, and because of the simplicity and reliability of the transmitting and receiver elements, which may be used to respectively regulate and respond to the air pressure transmitted.

In some cases, the receiver may be a simple measurement exhibiting instrument, comprising indicating and/or recording provisions, and in such case the required receiver instrument is, in effect, a pressure gauge. In many cases, however, the receiver is a control instrument, and in a preferred embodiment of the invention, the receiver is a measuring instrument having air controller provisions which may well take one or another of various known commercial or suitable forms.

My improved apparatus may be used in measuring a temperature, a pressure, a velocity, or, in fact, in measuring practically any physical force or quantity of which a measurement is desired. For example, the invention is well adapted for use in measuring a fluid rate of flow by means of a manometer, or differential pressure measuring means, included in the transmitter of my improved apparatus, and for such use I have devised a transmitter including novel means for making the air pressure transmitted to the receiver proportional to the rate of flow, although the differential pressure impressed on the manometer of the transmitter is not a linear function of the flow, but is approximately proportional to the square of the flow. The special means devised for this purpose are adapted for use in transmitters for measuring other quantities than rates of flow, where the measuring force impressed on the transmitter varies in non-linear proportion to the quantity measured.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Fig. 1 is a somewhat diagrammatic representation of flow metering and control apparatus comprising a transmitter and a receiver on which the transmitter impresses an air pressure varying with the flow;

Fig. 2 is a section through a manometer element of the transmitter shown in Fig. 1;

Fig. 3 is an elevation of the transmitter mechanism through which the manometer element regulates the pressure transmitted to the receiver;

Fig. 3A shows a booster to be used with a modification of Fig. 3;

Fig. 4 is a somewhat diagrammatic elevation of parts of the receiver and associated manual control means;

Fig. 5 is a section on the line 5—5 of Fig. 4;

Fig. 6 is a section of a transfer valve, taken on the line 6—6 of Fig. 5;

Fig. 7 is a view taken similar to Fig. 6, but showing parts in different relative positions;

Fig. 8 is an elevation partly in section illustrating a modification of the mechanism shown in Fig. 3;

Fig. 9 is a reproduction on a larger scale of a portion of Fig. 8;

Figure 10:
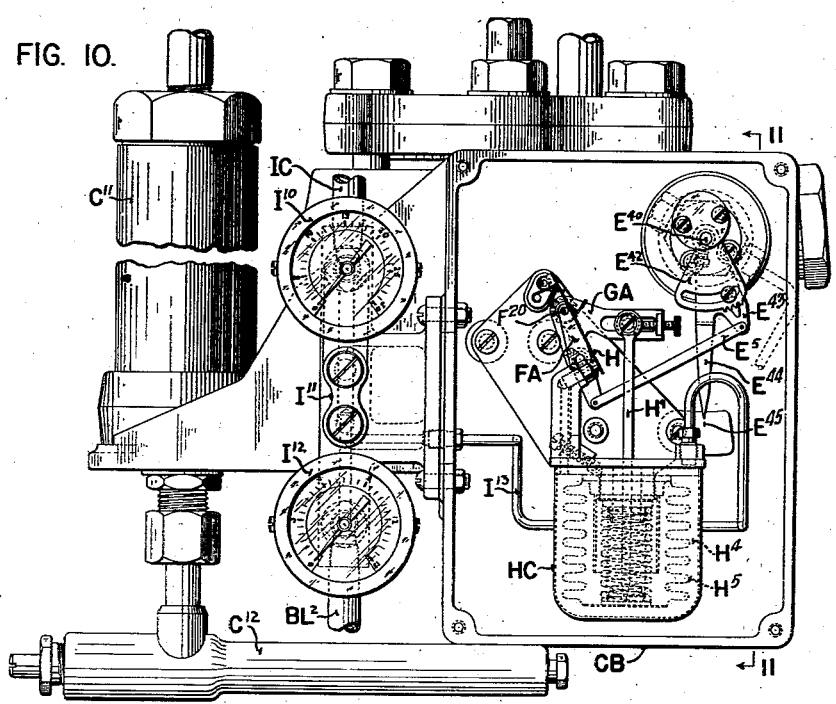
Fig. 10 is an elevation of a transmitter including a U tube manometer.

In Figs. 1-5, I have illustrated the use of the present invention in apparatus for measuring and recording a fluid flow, and for producing control effects varying as the flow varies. In the operation of that apparatus, the pressures at the high and low side of an apertured orifice plate A' in a conduit A differing from one another, due to flow through the conduit in the direction of the arrow, are transmitted by pipes $A^2$ and $A^3$, respectively, to a transmitter element B. The latter maintains an air pressure, which varies as the flow through the conduit A varies, and which is transmitted by the pipe BL to a distant receiver element L. The latter, as shown, is an instrument actuated by the air pressure transmitted to it, to record the flow through the conduit A, and to create variable control effects on variations in said flow. As shown, the instrument L is an air controller of a known commercial type, which acts to maintain a controlling air pressure which is proportional to the air pressure impressed on the receiver by the transmitter. In the arrangement shown in Fig. 1, the controlling air pressure maintained by the instrument may be transmitted, as hereinafter described through pipes L', and $Q^5$, to the pressure chamber of a fluid pressure motor valve $A^4$, the latter being thereby actuated to variably throttle the conduit A as required to maintain an approximately constant rate of flow therethrough.

The instrument B includes a manometer C responsive to the differential of the pressures transmitted by the pipes $A^2$ and $A^3$. In the form shown in Fig. 2, the manometer C comprises a casing enclosing a bellows chamber C'. A bellows D in the chamber C', is connected at one end to an annular member D', clamped between separable sections of the manometer casing, and surrounding a port $C^2$ through which the pipe $A^3$ communicates with the interior of the bellows D. The opposite end of the bellows is closed by an end head $D^2$. The pipe $A^2$ opens to the manometer chamber C', and the latter contracts and elongates as required to balance the pressure in the pipe $A^2$, acting externally on the bellows, against the sum of two forces. One of said forces is the pressure in the pipe $A^3$ transmitted to the interior of the bellows D through the port $C^2$, and the other of said forces is the tension of a spring $D^3$, which tends to elongate, and opposes the contraction of the bellows D.

The elongation and contraction of the bellows D, gives counterclockwise and clockwise rotative movements, respectively, to a rock shaft E, passing through a wall of the manometer casing and making a pressure tight joint therewith, said shaft having an arm E' within the chamber C', which bears against the outer side of the movable bellows head end $D^2$, approximately at its center, in all normal positions of the arm E'. The shaft E and parts connected thereto are biased, as by means of gravity, to hold the arm E' lightly in contact with the movable bellows end $D^2$. Externally of the chamber C', the shaft E carries an arm $E^2$. As shown, the arm $E^2$ transmits the angular movements of the shaft E to an arm $E^3$, which is pivotally mounted on the shaft E, but is normally clamped to the arm $E^2$ by the clamping screw $E^4$. The latter, when loosened, permits of an angular relative adjustment of the arms $E^2$ and $E^3$.

The oscillatory movements of the arm $E^3$ operate through a link $E^5$ to angularly adjust a lever F. The latter is connected by a pivot pin FG to a lever G which is mounted to turn about a fixed pivot $B^5$. At its end remote from the link $E^5$, the lever F carries a pin $F^2$ which controls the position of a flapper valve H relative to the nozzle, or bleed orifice, h, of the air controller valve mechanism of the instrument B. The flapper H is pivoted at $B^6$, and is biased for movement toward the nozzle h by a spring H', and is moved away from nozzle h, or permitted to approach the latter, accordingly as the pin $F^2$ is adjusted to the right or to the left, as seen in Fig. 3. The pin $F^2$ is moved to the right by a clockwise adjustment of the lever F about its pivot FG, and also by a counterclockwise adjustment of the lever G about its supporting pivot B. On a counterclockwise adjustment of the lever F, and also on a clockwise adjustment of the lever G, the pin $F^2$ is moved to the left, thereby permitting the valve H to approach the nozzle h. The nozzle h receives air through a restricted orifice $H^2$, from a compressed air supply pipe I. The nozzle pressure of the instrument B, i. e., the pressure at the outlet side of the restricted orifice $H^2$, depends upon the distance of the flapper valve H from the nozzle h, and the valve H is adjusted as required to make that pressure vary with the angular position of the shaft E.

In the apparatus shown in Fig. 2, the angular adjustment of the shaft E will be in linear proportion to the difference between the pressures at the opposite sides of the orifice plate A'. That pressure difference, while a function of the flow through the conduit A, is not in linear proportion thereto, but is approximately proportional to the square of the flow through the conduit A. For various reasons, it is practically important and desirable that the pressure in the nozzle h, which is the pressure transmitted to the receiver L, should vary in linear proportion with the flow through conduit A, and this result is obtained with the mechanism shown in Fig. 3, by its provisions for automatically adjusting the lever G about the pivot $B^5$, in response to variations in the nozzle pressure.

To so adjust the lever G, the nozzle pressure is transmitted through a passage $H^3$ to a bellows chamber $H^4$ in a flapper adjusting pressure responsive device HA, which, as shown, supports the nozzle h, flapper H, lever G, and other parts. A bellows element $H^5$ is located in the chamber $H^4$ and has one end anchored to an end wall of said chamber. The opposite and movable end of the bellows $H^5$, is closed by a head $H^6$. The interior of the bellows $H^5$ is exposed to the pressure of the atmosphere. The nozzle pressure transmitted to the chamber $H^4$ from the passage $H^3$, acts externally on the bellows $H^5$, tending to compress or shorten the latter. The contraction of the bellows is opposed by a resilient force which may comprise a component due to the resiliency of the bellows $H^5$, and a component due to a spring $H^7$. The tension of the latter may be adjusted by adjustment of a threaded abutment member $H^8$.

Changes in length of the bellows $H^5$, give corresponding angular adjustments to a lever J journalled on a stationary pivot JB. As shown, the lever J is operatively connected to the bellows by a plunger $H^9$, having one end engaging an abutment member $H^{10}$ within the bellows and carried by the movable end head $H^6$ of the latter and having its opposite end pivoted to a connection part J' connected to the lever J by a clamping screw $J^2$ passing through a slot $J^3$ in the lever J, whereby the pivotal connection between the plunger $H^9$ and the connection part J' may be adjusted toward and away from the pivot JB for the lever J. A micrometer screw $J^5$ threaded through a projection $J^6$ on the lever J is used to adjust the connection part J' along the lever J with a great degree of accuracy. The lever J is provided at its free end with a pin or projection J⁴ which engages the cam edge G' of a cam lever G.

The cam edge G' is so shaped with reference to the movement of the cam lever about its pivot B⁶, and with reference to the movement of the projection J⁴ about the pivot JB, that as the link E⁵ moves in approximate proportion to variations in the square of the rate of flow through the conduit A, the adjustments thereby given to the valve H by the pin F², are so modified by the adjustment of the cam lever G effected by the change in the pressure in the chamber H⁴, that said change in pressure will be in linear proportion to the change in said flow. As will be apparent, when the functional relation of the flow or other quantity measured, to the angular movement of the lever J is known, the cam edge G' can be given the shape necessary to make the pressure in the chamber H⁴ proportional to the flow or other quantity measured.

As shown, the instrument B includes flow indicating means comprising an index K pivoted at K' to deflect along an instrument scale B⁷ in accordance with the flow through conduit A. The index K is deflected by means of a link K³ connected to an arm K² pivoted coaxially with the index K and rigidly connected to the latter. The link K³ operatively connects the index K to the lever J. To this end, in the construction illustrated, in Fig. 3, the link K³ is pivotally connected through a connection part K⁴, to a lever arm K⁵, coaxial with the lever J and sharing the angular movements of the latter. The part K⁴ is connected to the arm K⁵ by a clamping screw and slot, so as to permit of an adjustment in the ratio of the angular movements of the lever J and the index K. The arm K⁵ is connected to the lever J so as to turn with the latter and imparts its movements to the index K. A spring K⁶ is provided to exert a clockwise bias on levers J and K⁵ to insure a more positive movement thereof than that of gravity. It is noted that counter-clockwise movement of lever J or upward movement of plunger H⁹ is limited by engagement between the upper edge of abutment member H¹⁰ and the lower edge of member H⁸.

In the above described apparatus of Fig. 3, the pressure in space H⁴ and pipe BL is the same as that in the nozzle h, although under certain circumstances it is desirable to maintain a higher pressure in chamber H⁴ which is proportional to the pressure in the nozzle h. As shown in Fig. 3A, the supply line I to the nozzle h does not directly communicate with the chamber H⁴ but controls the pressure in the latter by means of the booster valve HD. The device HD includes a bellows element HD' acted on by the pressure in a chamber HD² which is in unrestricted communication with the nozzle h. Bellows HD' is attached to one end wall of chamber HD² together with a second bellows HD³, the end wall of which is attached to the adjacent end wall of the bellows HD'. The interior of the bellows HD³ is exposed to a second chamber HD⁴ and is connected to a pilot valve stem HD⁵ which cooperates with a pair of nozzles HD⁶ and HD⁷ connected with the supply line I and atmosphere respectively, whereby the pressure in the chamber HD⁴ is determined by the position of valve member HD⁵. The end walls of the bellows HD' and HD³ have areas related in the ratio of the desired pressures in chambers HD² and HD⁴ respectively. The chamber H⁴ is in direct communication with the chamber HD⁴ by means of pipe HD⁸, so that the pressure in the latter is maintained in proportion to the pressure in the nozzle h.

It will be understood, of course, that in lieu of the insertion of the booster valve HD as shown in Fig. 3A, the booster valve may be inserted in the pipe line BL of a unit identical with the unit of Fig. 3, in which case the pressure in the chamber H⁴ is maintained equal to the pressure in the nozzle h, but the pressure in the responsive member L² may be made proportionally greater, as for example in an unusually long pipe line BL between the transmitting instrument B and the receiving instrument N.

In the form shown somewhat diagrammatically in Figs. 1 and 4, the receiver instrument L is a measuring and control instrument of commercial form, fully disclosed in Patent No. 2,125,081, granted July 26, 1938, on my prior application, and comprising means for maintaining a controlling air pressure varying through a suitable control range, as the force, controlling the operation of, and measured by the instrument, i. e., the pressure transmitted through the pipe BL, varies in either direction from the pressure corresponding to the normal value of the flow through the conduit A, which the control action of the instrument L tends to maintain.

As shown, the instrument L comprises a Bourdon tube L², to the stationary end of which the pipe BL is connected. The closed movable end of the tube L² angularly adjusts an arm L³ in one direction or the other, as the pressure in the pipe BL respectively increases or decreases. The arm L³ is connected by a link L⁴ to a rocking element L⁵ mounted to oscillate about an axis L⁶. The element L⁵ is pivotally connected by a link at L⁷ to one end of a lever L⁸. The other end of the lever L⁸ is pivotally connected at L⁹ to a second element L¹⁰ adapted to oscillate about the axis L⁶. Means including a link L¹¹ connecting the element L¹⁰ to an arm L¹² pivotally connected to the framework of the instrument L, and adapted for manual angular adjustment about its pivotal axis, are provided to angularly adjust the element L¹⁰ and thereby raise and lower the pivotal connection L⁹ for the lever L⁸, so as to vary the rate of flow which the apparatus tends to maintain. A link L¹³ is pivotally connected at one end to the lever L⁸ midway between the ends of the latter, and is pivotally connected at its opposite ends to a lever M'. The latter is journalled on a stationary pivot L¹⁴, and is adapted by its adjustment to vary the position of the flapper valve M relative to the nozzle m of the air controller mechanism of the instrument L. As shown, an arm M² secured to and sharing the oscillatory movements of the lever M', acts on the flapper valve M through a thrust member N. The latter is in the form of a pin carried by a link N' pivotally connected to an arm N² pivoted to the instrument framework at L¹⁵. The arm N² is gear connected to an element N³ which is manually adjustable angularly about an axis.

In the commercial form of the receiver instrument shown in Fig. 4, the nozzle m receives air from a compressed air supply pipe IA through a restricted orifice (not shown), so that the pressure in the nozzle m varies with the adjustment of the flapper M. The adjustment of the thrust member N, by varying the leverage with which the lever M' operates on the flapper valve M, varies the ratio between the extent of a departure of the pressure transmitted through the pipe BL to the Bourdon L² from a normal value of that pressure, and the resultant change in the pressure in the nozzle $m$. In the commercial form of instrument shown in Fig. 4, the pipe IA supplies air under pressure to a pilot valve mechanism O, which is controlled by the pressure in the nozzle $m$, so that the pressure in the pipe L', which leads from the delivery port of the pilot mechanism O, is proportional to the pressure in the nozzle $m$.

As shown, the instrument L includes a pen arm $L^{16}$ connected to the rocking element $L^5$, which indicates, and cooperates with a rotating record chart $L^{17}$ to record, the rate of flow through the conduit A. An index $L^{18}$, connected to the rocking element $L^{10}$, indicates on the chart scale, the value of the rate of flow which the adjustment of valve $A^4$ tends to maintain. With the flow at the desired normal value, the pen arm $L^{16}$ and the index $L^{18}$ both indicate the same value on the chart $L^{17}$.

The preferred embodiment of the invention shown in Figs. 1, 4, 5, 6, and 7, comprises means for readily shifting between an operating condition, in which the valve $A^4$ is automatically controlled by the instrument L, and a condition in which said valve is subject to manual control. As shown, the said means comprise a so-called remote manual control panel P, a manually operable transfer valve or cock Q, and a manually adjustable pressure regulator R. The valve Q, as shown, comprises a casing formed with a valve chamber Q' in which an angularly adjustable plug valve or cock $Q^2$ is mounted. By means of a handle $Q^3$, the cock $Q^2$ can be adjusted between its automatic control condition shown in Fig. 6, and its manual control condition shown in Fig. 7. The casing of the valve Q is formed with ports QA, $Q^4$, QL and QR, communicating with the valve chamber Q'. The port $Q^4$ is a somewhat restricted bleed port, or vent to the atmosphere. The port QA is connected by the pipe $Q^5$ to the pressure chamber of the control valve $A^4$. The port QL is connected to the delivery end of the pipe L', through which the control pressure of the instrument L is transmitted to the valve chamber Q'. The port QR is connected to the delivery end of a pipe R', through which the pressure maintained by the regulator R is transmitted to the valve chamber Q'.

The valve member $Q^2$ is cut away, so that in its angular position shown in Fig. 6, it does not interfere with free communication between the ports QL and QA, but a portion $Q^6$ of the valve member then closes the bleed port $Q^4$ and inlet port QR. With the automatic control adjustment of the valve member $Q^2$ shown in Fig. 6, the valve chamber Q', serves in effect as a part of an unobstructed conduit connection for transmitting the control pressure maintained by the instrument L to the valve $A^4$. In the manual control condition of the valve Q, illustrated in Fig. 7, the valve member part $Q^2$ closes the port QL, but does not interfere with communication between any two of the ports QA, QR and $Q^4$. With the port QR wide open, as shown in Fig. 7, the valve chamber Q' is adapted to receive air from the regulator R as required to maintain a pressure in the valve chamber Q', and thereby in the pressure chamber of valve $A^4$, which is substantially equal to the delivery pressure of the regulator R, notwithstanding the continuous but restricted discharge of air through the bleed orifice $Q^4$. The valve member $Q^2$ may be adjusted into an off position intermediate its positions shown in Figs. 6 and 7, in which the valve portion $Q^6$ closes communication between each of the ports QR and QL and the valve chamber Q', while leaving the port QA in free communication with the atmosphere through the valve chamber Q' and bleed port $Q^4$, so that atmospheric pressure is then maintained in the pressure chamber of the control valve $A^4$, and the latter is wide open.

The pressure regulator R is, in effect, an automatic pressure reducing valve, readily adjustable to vary the delivery pressure which it maintains. As shown it comprises inlet and outlet ports $R^2$ and $R^3$ respectively communicating with one another through a valve passage $R^4$, variably throttled by a reciprocating valve member $R^5$. The inlet port $R^2$ is connected to a branch IA' of the piping supplying compressed air to the instrument L. The outlet port $R^3$ is connected by the previously mentioned pipe or conduit R' to the port QR of the valve Q. The delivery pressure which the regulator maintains, depends upon a manual adjustment hereinafter described, and is maintained as a result of the automatic adjustment of the valve member $R^5$. That adjustment is effected by means of a diaphragm $R^6$ connected to the valve member $R^5$ by means of engagement of diaphragm $R^6$ with a member $R^{15}$ which is rigidly connected by a pair of studs to part $R^5$. The valve member, comprising the part $R^5$ of hexagonal shape, the part $R^{15}$, and the connecting studs which serve as guides, is adapted to slide as a unit in accordance with the unbalance of forces exerted by opposed springs $R^7$ and $R^{70}$ and the diaphragm $R^6$. Diaphragm $R^6$ is subjected on one side to the pressure in the delivery port $R^3$ and actuated in the opposite direction by the pressure of the atmosphere and the tension of a spring $R^7$. The tension of the spring $R^7$ may be adjusted by the rotation of a threaded spindle $R^8$, in threaded engagement with an axially adjustable abutment member $R^9$ against which one end of the spring $R^7$ acts. The spindle $R^8$ is provided with an operating knob $R^{10}$ at the front side of the panel P for the manual axial adjustment of the member $R^9$, whereby the pressure transmitted through the port $R^3$ and pipe R' to the port QR of the valve Q, and thence to the control valve $A^4$, may be manually controlled when the transfer valve is in the adjustment shown in Fig. 7. As shown, a port $R^{11}$ is provided to permit the delivery pressure acting on the diaphragm $R^6$ to reduce quickly, when the delivery pressure for any reason exceeds a predetermined maximum carrying diaphragm $R^6$ away from part $R^{15}$ when the parts $R^5$—$R^{15}$ have reached the limit of their movement to the left.

The panel P is shown as provided with a pressure gauge $P^{10}$, connected to the pipe $Q^5$, and adapted to measure the control pressure impressed on the valve $A^4$, whether that pressure is automatically controlled by the instrument L, or is manually controlled through the regulator R.

The general operation of the apparatus shown in Figs. 1-7, as will be apparent from what has already been said, may be summarized as follows:

As the flow through the conduit A varies, the pressure differential transmitted by the pipes $A^2$ and $A^3$ to the manometer C, elongates or contracts the bellows D, and thereby gives angular movement to the shaft E. Each angular movement of the latter, gives an angular movement to the lever F, and thereby adjusts the flapper H. The resultant change in the pressure in the nozzle $h$ acts through the bellows $H^5$ to effect an adjustment of the lever J along the cam edge G', and thereby effects a further adjustment of the valve H. With the cam edge G' of the lever G suitably shaped, the ultimate adjustment given the flapper valve H will be that required to vary the control pressure in the nozzle $h$ in accordance with the change in the rate of flow in the conduit A, although the pressure differential transmitted by pipes $A^2$ and $A^3$ varies approximately in proportion to the square of the flow through the conduit.

The transmitter B is so adjusted that at the minimum flow which it is desired to record, for the range of the manometer being used, the pin $J^4$ will be engaging lever G at the point where the cam surface G' intersects a second cam surface $G^2$ of the lever G, and the air pressure in space $H^4$ will be at the lowest value it assumes for transmitting purposes. The inclination of cam surface $G^2$ with respect to the path of movement of pin $J^4$, is such that when the pin $J^4$ is in engagement with the surface $G^2$, a given change in pressure in the space $H^4$ will result in a greater angular adjustment of the lever G, than when surface G' is engaged by the pin $J^4$. In consequence, a movement of the link $E^5$ of given extent, will result in a smaller change in the pressure in space $H^4$, when pin $J^4$ is in engagement with surface $G^2$ than when in engagement with surface G'. Since the variation in this air pressure causes a consequent variation in the setting of the indicator K, the use of the cam surface $G^2$ provides a more definite zero point, which would otherwise be critical due to the high multiplying factor of surface G'. When the transmitter is not operating, the air pressure in space $H^4$ becomes equal to that of the atmosphere, and the indicating hand pointer K will move below the zero of scale $B^7$ in Fig. 1, thus showing that the instrument is out of service.

The nozzle pressure of the instrument B, is transmitted by the pipe BL to the Bourdon tube $L^2$, which constitutes the primary measuring, or responsive, element of the instrument L. Changes in the pressure impressed on the Bourdon tube $L^2$, result in adjustments of the flapper valve M of the instrument L, and thereby of the control pressure in the nozzle $m$. The pilot valve mechanism O, when the transfer valve Q is in the position shown in Fig. 6, operates to transmit a pressure through the pipe L' to the pressure chamber of the fluid pressure motor valve $A^4$ which is proportional to the pressure in the nozzle $m$. Since there is no significant flow through the conduit BL, the pressure transmitted to the Bourdon tube $L^2$ may be identical with that in chamber $H^4$, or if the booster mechanism of Fig. 3A is used, the pressure transmitted to the Bourdon tube is proportional to that in chamber $H^4$, but of a larger value.

As the pressure impressed on the valve $A^4$ increases or decreases, the valve operates in the direction to decrease or increase the throttling effect of the valve on the flow, and thereby tends to maintain the flow at its normal value. The normal flow value which the operation tends to maintain, depends upon the adjustment of the manually adjustable member $L^{12}$, which by its adjustment raises or lowers the pivotal connection $L^9$ supporting one end of the lever $L^8$, and thereby varies the position of the flapper valve M corresponding to a given angular adjustment of the arm $L^3$. The magnitude of the change in the control pressure of the instrument L resulting from a given change in the pressure impressed on the Bourdon tube $L^2$, may be varied, and the control range of the instrument thereby adjusted, by angular adjustment of the part $N^3$, whereby the leverage with which the lever M' acts on the flapper valve M, may be varied.

When the transfer valve $Q^2$ is adjusted into the position shown in Fig. 7, the control effect of the instrument on the valve $A^4$ is interrupted, and the latter is made subject to manual control effected by angular adjustment of the knob $R^{10}$, as has been fully described. The adjustment of the transfer valve Q into its position shown in Fig. 7, while interrupting the control action of the instrument L does not interrupt the remote measuring or measurement exhibiting function of the latter, since, as previously indicated, the present invention may be used with advantage in arrangements including a receiver which includes no air controller or other control mechanism. In my said prior patent, I illustrate instrument forms alternative to the form shown in Fig. 4 herein, and any one of those alternative forms, as well as still other commercial forms of pressure actuated measuring instruments, may be used, as conditions make desirable, in place of the particular instrument shown herein.

It is well known that in mechanical problems involving levers and gears to amplify a given motion, it is necessary to sacrifice power in the inverse ratio. Experience also shows a loss of accuracy due to backlash. A pneumatic system of the present type has a unique characteristic in that it can simultaneously amplify power and motion without any appreciable decrease in accuracy. It is interesting to note that in the unit above described, where the pneumatic amplifications are the greatest (near zero flow), the contact angle between lever G and projection $J^4$ is at a minimum. This well illustrates how the pneumatic system produces a high multiplication of motion with mechanical forces that are actually low. If, due to improper treatment of the transmitter B and instrument L, some friction might develop in the bearings thereof, it will cause a slight increase in air pressure to be transmitted in line BL over that which is truly proportional to the value of the condition. The excess air pressure when it reaches the instrument L will be used to overcome the friction therein so that a true reading is obtained. In actual practice it has been found desirable to make the friction of the transmitter B and instrument L as near the same as possible so that the friction of the two devices will balance each other so that a true reading will be obtained at the recorder and controller. In mechanical systems the transmission error is proportional to the sum of the friction while in my system it is proportional to the difference in friction of the transmitting and measuring elements.

The air controller mechanism of a transmitter, like that of the receiver, may take various forms, and in Figs. 8 and 9, I have illustrated by way of example, one modification of the transmitter mechanism shown in Fig. 3. The mechanism of Fig. 8 is shown as comprising parts E, $E^2$, $E^3$, K, K', $K^2$ and $K^3$, similar to the correspondingly designated parts of Fig. 3, and as including a pressure responsive device HB including parts $H^4$, $H^5$ and $H^7$ differing significantly from the device HA only in respect to the manner, in which the pressure in its chamber $H^4$ is varied. The chamber $H^4$ of device HB constantly receives air from the supply pipe I through a restricted orifice $H^{30}$, and the pressure in said chamber is controlled by variably throttling an axial vent passage $H^{32}$ formed in a member $H^{31}$ within and secured to the movable end of the bellows $H^5$. As shown best in Fig. 9, the member $H^{31}$ is provided with an axially adjustable valve seat member $H^{33}$. The latter comprises a tubular body portion threaded into the enlarged upper end portion of the passage $H^{32}$ and formed with a transverse internal portion $H^{34}$ through which extends an axial port $H^{35}$. Flow through the latter is controlled by a valve disc $H^{36}$. The latter is biased to its closed position in which it engages an annular valve seat on said partition $H^{34}$ by the pressure in the chamber $H^4$, and also by the action of a light spring $H^{37}$.

The arm $E^3$ acts on the valve $H^{36}$ through a thrust rod $E^{30}$ which engages the outer end of the stem $H^{38}$ of the valve $H^{36}$. When the arm $E^3$ is moved counterclockwise as seen in Fig. 8 as a result of a change in the measuring force which angularly adjusts the shaft E, the rod $E^{30}$ moves the valve $H^{36}$ in the opening direction, against the biasing force action, to thereby decrease the pressure in the chamber $H^4$. When the valve $H^{36}$ is thus moved to reduce the pressure in the chamber $H^4$, the bellows $H^5$ elongates under the action of the spring $H^7$, until the valve seat $H^{34}$ is moved into engagement with the valve $H^{36}$, interrupting the outflow of air from the chamber $H^4$.

On a change in the quantity measured in a direction giving a clockwise adjustment to the arm $E^3$, as seen in Fig. 8, the valve $H^{36}$ snugly engages its seat and closes the port $H^{35}$, so that the pressure in the chamber $H^4$ then increases until the resultant contraction of the bellows $H^5$ moves the partition $H^{34}$ farther than the valve $H^{36}$ is permitted to move, owing to the re-engagement of its stem $H^{38}$ with the thrust rod $E^{30}$. A rib $H^{39}$ is formed on the outer surface of member $H^{31}$ which is adapted to cooperate with the lower edge of closure member $H^{40}$ to act as a stop and prevent too great a contraction of the bellows $H^5$. In the normal balanced condition of the apparatus, the valve $H^{36}$ is cracked so that air may vent from the chamber $H^4$ through the port $H^{35}$ at the same rate at which air passes into the chamber from the restricted port $H^{30}$. As will be apparent, the bellows $H^5$ is thus caused to contract and expand in accordance with the angular adjustment of the rock shaft E, and without subjecting the latter to any significant reactive force. The pressure in the chamber $H^4$ is transmitted by the pipe BL' to the receiver L, or to some other receiver element.

In Fig. 8, the contraction and expansion of the bellows $H^5$, gives corresponding movements to a transmitter index K, through a lever JA pivoted at $J^{30}$ and having one end in engagement with the end of the part $H^{33}$, and adjustably connected at its other end to one end of the link $K^3$. The transmitter mechanisms shown in Figs. 8 and 9 is somewhat simpler than that shown in Fig. 3, but comprises no equivalent for the means shown in Fig. 3, for converting a measuring force which is a non-linear function of the quantity measured, into an air pressure varying in linear proportion with said quantity.

Figure 11:
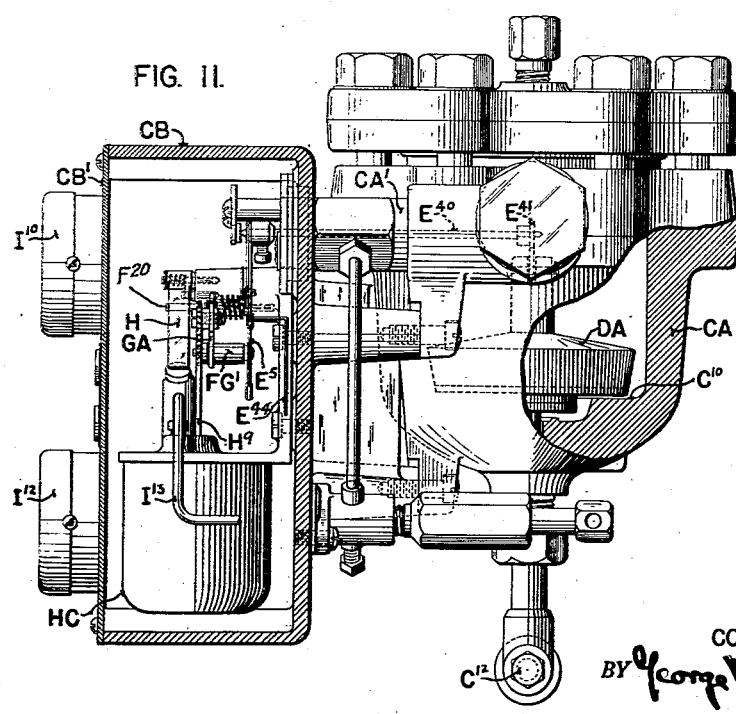
Fig. 11 is a view taken at right angles to Fig. 10 and partly in section on the line 11—11 of Fig. 10.

In Figs. 10 and 11, I have illustrated a transmitter differing in various respects from the transmitter B of Fig. 1, and comprising a manometer of the U tube type, the high pressure leg of which is formed by a float chamber $C^{10}$ in a casing body CA. The low pressure leg of the manometer comprises a so-called range tube $C^{11}$, removable to permit the interchangeable use of range tubes of different dimensions, as operating conditions, and particularly the magnitudes of the differential pressures impressed on the manometer, may vary. As shown, the low pressure leg of the manometer is connected to the flow chamber $C^{10}$ by a separable tubular connecting structure $C^{12}$. As those skilled in the art will understand, on an increase in the flow, and a resultant increase in the excess of the pressure in the float chamber $C^{10}$ over that in the low pressure leg of the manometer, a sealing liquid, ordinarily mercury, is displaced from the float chamber $C^{10}$ into the range tube $C^{11}$.

A suitable float DA rests upon the sealing liquid in the float chamber $C^{10}$, and shares the rising and falling movements of the sealing liquid level in said chamber. The float DA has uprising stem portion connected to an arm $E^{41}$ of a horizontal rock shaft $E^{40}$. The latter, as shown, is located in a horizontal tubular extension or projection CA' from the casing body CA open at one end to the float chamber $C^{10}$, and having its opposite closed end formed with a suitable pressure tight bearing for the rock shaft $E^{40}$. The shaft $E^{40}$ is oscillated in accordance with variations in the flow measuring pressure differential impressed on the manometer, and corresponds in its general purpose and effect to the rock shaft E of the manometer shown in Fig. 2.

The shaft $E^{40}$ may be arranged to control the air pressure transmitted, by flapper adjusting mechanism, which might be like that shown in Fig. 3, or that shown in Fig. 8, but as shown, is different from each of the last mentioned mechanisms. The flapper adjusting mechanism of Figs. 10 and 11, is located in a mechanism chamber in a casing body CB of box-like form, said chamber having a removable vertical front side CB', and having its rear wall bolt or screw connected to the casing body CA. The shaft $E^{40}$ extends into the mechanism chamber through the rear wall of the body CB, and within the latter carries an arm $E^{42}$ rigidly secured, and an arm $E^{43}$ adjustably secured to the shaft $E^{40}$ as the arms $E^2$ and $E^3$ of Fig. 3 are connected to the shaft E. The arm $E^{43}$ is connected by a link $E^5$ to one arm of a lever or rocking element FA corresponding generally to the lever F of Fig. 3 and having intermediate its ends a pivot or rock shaft portion FG' journalled in one arm of a bell crank lever GA. The latter is supported on a fixed pivot and has a second arm adjustably connected to the plunger $H^9$ of a pressure responsive, valve adjusting device HC, which may be identical, in its general construction and operating characteristics with the device HA of Fig. 3, from which it differs in minor respects only. One arm of the element FA carries a pin or projection $F^{20}$ for adjusting the flapper valve H as does the pin $F^2$ of Fig. 3.

Operatively, the difference between the pressure regulating mechanism of Fig. 3, and that of Figs. 10 and 11, is found in the fact that the lever GA of Figs. 10 and 11, which provides the adjustable fulcrum for the flapper acting element FA, is directly connected to the movable end wall of the bellows $H^5$ of the device HC, so that the air pressure transmitted is approximately proportional to the square of the flow rate, instead of to the flow rate. In the form shown in Figs. 10 and 11, the compressed air supply pipe IC leads to the inlet of a pressure gauge $I^{10}$ for measuring the air supply pressure. The outlet of the pressure gauge $I^{10}$ is connected by a conduit $I^{11}$ to the inlet of a pressure gauge $I^{12}$ for measuring the air pressure transmitted from the transmitter from the pipe $BL^2$ to the associated receiver. The latter need not differ from that associated with the transmitter B of Fig. 1. As shown, there is a conduit connection including a pipe $I^{13}$ between the chamber $H^4$ of the device HC and the conduit connection $I^{11}$ at the outlet side of a restricted orifice (not shown) formed in the latter. The pressure transmitted through the receiver to the pipe $BL^2$, is thus the pressure existing in the chamber $H^4$ of the device HC, and that pressure depends on the varying adjustment of the associated flapper valve H. An index $E^{44}$ connected to the rock shaft arm $E^{43}$ associated with a zero mark $E^{45}$, assists in calibrating the manometer.

The manometer construction illustrated in Figs. 10 and 11 forms no part of the invention claimed herein, but is disclosed by way of example as adapted for use in a transmitter differing from that collectively shown in Figs. 1, 2, and 3. The manometer of Figs. 10 and 11, is better adapted for use with relatively high pressures than is the bellows manometer shown in Fig. 2. The transmitter shown in Figs. 10 and 11 is adapted for use under conditions in which it is not important that the transmitter should furnish any direct indication of the value of the flow quantity measured, and its construction is simplified, and its inherent construction cost reduced, by the omission of exhibiting elements.

The apparatus disclosed herein has numerous practically important advantages, in addition to the general advantages previously mentioned. For one thing, such apparatus can be made very sensitive. With the form of transmitter shown in Figs. 10 and 11, for example, a definite transmitter pressure change may be produced by a change in the manometer float level of one thousandth of an inch. The operation of the transmitter is desirably stable, because of the operation of the pressure responsive device HA, HB or HC, whereby the effect of each initial adjustment of the flapper or other primary control valve is in effect measured and regulated.

The speed of transmission to the receiver of a change in the transmitter pressure is desirably rapid. A one percent change in pressure, for example, may be transmitted 200 feet in less than a second, even though the apparatus includes no pilot or booster valve mechanism, such as the above mentioned mechanism O. By the use of such a valve, the speed of transmitting a pressure change may be increased several times. Since the transmission of a pressure change from the transmitter to the receiver requires no significant or appreciable flow through the transmission conduit, the latter may be of small cross section and in practice, conduit piping having an internal diameter three thirty seconds of an inch is customarily employed. Since there is no significant flow between the transmitter and the receiver, the air consumption of the transmitter is substantially less than that of an ordinary air control instrument.

The accuracy of the apparatus is practically independent of the effect of ambient temperature changes, and with the small amount of air required, the drying of the air to avoid freezing, objectionable ice formation in the transmission system, when the latter is exposed to very low temperatures, is a relatively simple matter. While it is generally desirable, as in the case of all air controller apparatus, that the compressed air used, should be supplied at an approximately constant pressure, considerable variations in that pressure are relatively unimportant. For example, with the usual nominal supply pressure of 17 pounds per square inch customarily employed for air controller purposes, a 25% variation in the pressure of the air supplied to the transmitter will result in a change of receiver readings of less than 1%. The accuracy of the apparatus is not significantly effected by external vibration.

The transmitter in all of the forms disclosed, comprises only a relatively small number of parts apt to be impaired or deranged under normal operating conditions, so that there is little liability for the apparatus to get out of order. The transmitter operating forces are of a desirable order. The force required for the adjustment of the tansmitter flapper valve is minute, and the relatively small amount of motion required, coupled with the fact that the relative movements of parts in frictional engagement, are wholly or mainly the only significant source of angular movements, makes the friction loss very small.

In all forms of the transmitter disclosed herein, the extent of movement of the flapper valve relative to the cooperating nozzle, required for the full contemplated range of air pressure variations, is minute. While each different air pressure in said range requires a different relative position of the flapper valve and nozzle, the movement of the flapper valve between positions corresponding to significantly different air pressures is so small as to make an accurate direct indication thereof, practically difficult, and the creation of any definite difference of pressure by moving the flapper a directly measured distance assumed or calculated to be that needed, would be impractical. My improved transmitter in all of its forms is advantageously characterized, however, by the fact that the small required range of flapper movement results from the opposing effects on the flapper valve position, of a measuring element deflection range and a range of variations in bellows length resulting from changes in the control pressure. Each of the last mentioned ranges is much larger than the first mentioned ranges, and is large enough to make it relatively easy to design, construct, and calibrate the bellows, deflecting element and their connections to the flapper valve.

In the claims following this description the reference to the air pressure varying in accordance with the condition being measured, is intended to means a pressure which is either equal to or in proportion to the pressure in the nozzle of the transmitter element.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A flow meter, comprising in combination a manometer including an element adapted to deflect in accordance with the differential of two pressures impressed on said manometer, means creating an air pressure varying in a predetermined non-linear proportion with the deflections of said element, and comprising a valve, connections between said element and valve to adjust said valve by said element to increase or decrease said pressure as said element deflects in one direction or the other, a bellows device subjected to said pressure and adapted to elongate and contract independently of said element as said pressure changes in one direction or the other, connections between said device and valve to adjust said valve on each such movement by said device in the direction tending to neutralize the change in said pressure giving rise to such movement, whereby the valve is adjusted through a range substantially smaller than the ranges of element deflection and bellows movement giving the valve its adjustment, and pressure responsive measuring means including exhibiting means for measuring and exhibiting said air pressure.

2. Measuring apparatus comprising in combination, an instrument including an element deflecting in accordance with a measurable quantity, means controlled by said element including means operating non-linearly in relation to the deflection of said element to maintain an air pressure varying in a predetermined non-linear proportion with the deflection of said element, and an instrument comprising a pressure responsive device, to which said air pressure is transmitted, and exhibiting means actuated by said device in accordance with the said air pressure.

3. The combination with an element deflecting in accordance with the value of a non-linear function of a variable, of means adapted to maintain a fluid pressure varying in linear proportion with the value of said variable and comprising a fluid pressure regulating valve, means actuated by said element to adjust said valve in accordance with the deflection of said element, and means actuated by the change in said pressure resulting from such valve adjustment, to subject said valve to an opposing adjustment in a predetermined non-linear proportion to the change in the value of said pressure produced by the first mentioned valve adjustment.

4. The combination with a device adapted to deflect in accordance with variations in a variable quantity, of means through which the deflection of said device is adapted to create an air pressure which varies in non-linear proportion with said variation, said means comprising a container for air under pressure, a valve adjustable to vary the air pressure in said container, and valve adjusting means comprising an adjustable member, a lever pivotally mounted on said member, and adapted to adjust said valve by angular adjustments relative to said member and in accordance with the adjustments of the latter, and means for adjusting said member in a predetermined non-linear proportion to changes in the air pressure in said container.

5. The combination with a device adapted to deflect in accordance with variations in a variable quantity, of means through which the deflection of said device is adapted to create an air pressure which varies in non-linear proportion with said variation, said means comprising a container for air under pressure, a valve adjustable to vary the air pressure in said container, and valve adjusting means comprising an adjustable member, a lever pivotally mounted on said member and adapted to adjust said valve by its angular adjustments relative to said member and on adjustments of the latter, a part moving in accordance with changes in said pressure, and cam means through which said part adjusts said member in non-linear proportion to changes in the movement of said part.

6. The combination with a device adapted to deflect in accordance with one function of a variable quantity, of means through which deflection of said device is adapted to maintain an air pressure which varies in accordance with a second and different function of said quantity, said means comprising a container for air under pressure, a valve adjustable to vary said pressure, valve adjusting means comprising a primary lever angularly adjustable about an axis fixed relatively to said container, a second lever pivotally mounted on the first mentioned lever and adapted to adjust said valve in response to its angular adjustments relative to the first mentioned lever and in accordance with the angular adjustments of the latter and a third lever angularly adjustable about an axis displaced from the first mentioned axis and fixed relative to said container, said primary and third levers having coacting parts through which the angular adjustments of said third lever gives said primary lever angular adjustments in non-linear proportion to the adjustments of the third lever, and means actuated by said air pressure to angularly adjust said third lever as said air pressure changes.

7. In measuring apparatus, the combination with an element deflecting in accordance with the value of a non-linear function of a quantity to be measured, of means for creating a fluid pressure varying in linear proportion with the value of said function, the last mentioned means comprising a fluid chamber, a valve regulating the pressure of the fluid in said chamber, and means for effecting predetermined non-linear adjustments of said valve in joint response to the deflection of said element and to the variation in said pressure.

8. The combination with air controller means adapted to automatically vary an air pressure in accordance with changes in a controlling condition, of a fluid pressure actuated regulating device, a manually adjustable regulator for maintaining a second air pressure varying in accordance with the adjustment of said regulator, and a valve manually adjustable between one position in which said first mentioned air pressure is transmitted through said valve to said device, and a second position in which said second air pressure is transmitted through said valve to said device, in moving between said one and second positions, passing through an intermediate position in which neither of said pressures is transmitted to said device, said valve having a bleed port closed when said valve is adjusted into said one position and opened by an adjustment of said valve into either of its other positions.

9. The combination with an element deflecting in accordance with variations in a variable quantity, of means adapted to maintain an air pressure varying in predetermined accordance with the deflection of said element and comprising a pressure chamber having an opening in its wall, a bellows in said chamber and having one end secured to said wall at the margin of said opening and having its second end movable, and comprising a part secured to and sharing the movement of the second end and formed with a vent passage for the discharge of air from said chamber through said bellows and opening, a spring opposing the contraction of said bellows, means for continuously supplying air under pressure to said chamber at a restricted rate, and a valve moved longitudinally of said bellows by the deflection of said element and adapted to continuously variably throttle said passage on relative movements of said valve and part, longitudinally of said bellows.

10. In a pneumatic remote telemetering system the combination with a manometer of the U tube type comprising a casing structure enclosing a float chamber, of a float adapted to be moved vertically by variations in the height of sealing liquid level in said chamber, a horizontally disposed rock shaft extending through and journalled in the enclosing wall of said chamber and carrying an arm connected to said float through which the vertical movements of said float oscillate said shaft, a pressure chamber supported by said casing structure external to the float chamber and formed with an opening in its wall, a bellows device having one end secured to said wall at the margin of said opening and providing a closure for the latter, and resiliently opposing the tendency of pressure in said chamber to change the bellows length, means for maintaining a variable air pressure in said pressure chamber comprising a valve, means through which the oscillations of said rock shaft adjusts said valve, and separate means through which each expansion or contraction movement of said bellows adjusts said valve in a direction tending to neutralize the change in said pressure giving rise to said movement, whereby each adjustment of the rock shaft results in a definite change in the pressure in said chamber and whereby the total adjustment range of said valve may be very small in comparison with the total adjustment ranges of said shaft and bellows, and remotely located pressure measuring means separate from said casing structure, to which said pressure is transmitted.

11. The combination with a fluid pressure operated device of means to automatically adjust the pressure of a supply of fluid in response to variations in the value of a variable condition, a manually operable pressure regulator adapted to vary the pressure of a supply of fluid, valve means separate from said pressure regulator operable to connect said device with either the fluid adjusted by said automatic means or with the fluid adjusted by said pressure regulator, and gauge means to indicate the value of the pressure impressed on said device.

12. The combination in an air control system of means adapted to automatically vary an air pressure in accordance with changes in a control condition, of a fluid pressure actuated device, a manually adjustable regulator for maintaining a second air pressure varying in accordance with the adjustment of said regulator, and a valve manually adjustable between one position in which said first mentioned air pressure is transmitted through said valve to said device and a second position in which said second air pressure is transmitted through said valve to said device, and a bleed port open when said valve is adjusted to a position in which the second air pressure is transmitted to the device.

13. The combination in an air control system, of means adapted to automatically vary an air pressure in accordance with changes in a control condition, of a fluid pressure actuated device, a manually adjustable regulator for maintaining a second air pressure varying in accordance with the adjustment of said regulator, and a valve operable independently of said pressure regulator and manually adjustable between one position in which said first mentioned air pressure is transmitted through said valve to said device, and a second position in which said second air pressure is transmitted through said valve to said device, and a bleed port in communication with said second air pressure to vent the same when said valve connects said second air pressure to said device.

14. Measuring apparatus comprising in combination, an instrument including an element adapted to deflect into different positions in accordance with a variable quantity, means adapted to maintain an air pressure varying in predetermined accordance with the deflection of said element and comprising a valve, connecting means between said valve and element whereby said valve is adjusted by said element to increase or decrease said pressure as said element deflects in one direction or the other, a bellows device subjected to said pressure and adapted to elongate and contract independently of said element as said pressure changes in one direction or the other, connecting means between said bellows device and valve to adjust said valve on each such movement in the direction tending to neutralize the change in said pressure giving rise to such movement, said connecting means being so proportioned that the valve is adjusted through a range substantially smaller than the ranges of element deflection and bellows movement giving the valve its adjustment, means included in said last mentioned connecting means to vary the ratio between the change in bellows length and the resultant change in valve position as said pressure varies whereby said pressure is caused to vary in non-linear proportion with the variations in said variable quantity, and pressure responsive measuring means for measuring said air pressure.

15. A pneumatic remote telemetering system comprising in combination, a transmitter instrument including an element adapted to deflect into different positions in accordance with variations in a variable quantity, means adapted to maintain an air pressure varying in predetermined accordance with the deflection of said element comprising valve means forming a continuous variable bleed to atmosphere, a fixed restriction through which air is supplied under constant pressure to said valve means, said valve means being adjusted by said element to increase or decrease said pressure as said element deflects in one direction or the other, a bellows device subjected to said pressure and adapted to elongate and contract independently of said element as said pressure changes in one direction or the other and adapted to adjust said valve means on such movement in the direction tending to neutralize the change in said pressure giving rise to such movement and separate connections between said element and valve means and said bellows and valve means, said connections being so proportioned that the valve means is adjusted through a range substantially smaller than the ranges of element deflection and bellows movement giving the valve means its adjustment, a receiver measuring instrument located at a distance from the transmitter instrument comprising pressure measuring means and exhibiting means operated thereby, and pressure transmitting means for subjecting said pressure measuring means to said air pressure.

16. A pneumatic remote telemetering system comprising in combination, a manometer including an element adapted to deflect in accordance with variations in the differential of two pressures impressed on said manometer, means creating an air pressure varying in predetermined accordance with changes in said pressure differential and comprising valve means forming a continuous variable bleed to atmosphere, a fixed restriction through which air is supplied under constant pressure to said valve means, said valve means being adjusted by said element to increase or decrease said pressure as said element deflects in one direction or the other, a bellows device subjected to said pressure and adapted to elongate and contract independently of said element as said pressure changes in one direction or the other and adapted to adjust said valve means on each such movement in the direction tending to neutralize the change in said pressure giving rise to such movement and separate connections between said element and valve means and said bellows and valve means, said connections being so proportioned that the valve means is adjusted through a range substantially smaller than the ranges of element deflection and bellows movement giving the valve its adjustment, and remotely located measuring means for measuring said air pressure and exhibiting means operated thereby.

17. A pneumatic remote telemetering system comprising in combination, a transmitter instrument including an element adapted to deflect into different positions in accordance with variations in a variable quantity, means adapted to maintain an air pressure varying in predetermined accordance with the deflection of said element and comprising valve means forming a continuous variable bleed to atmosphere, a fixed restriction through which air is supplied at a constant pressure to said valve means, connections between said element and valve means to adjust said valve means by said element to change said pressure accordingly as said element deflects, an expansible chamber device subjected to said pressure and adapted to expand and contract independently of said element as said pressure changes and connections between said device and valve means to adjust said valve means on each such expansion or contraction in a direction tending to neutralize the change in said pressure giving rise to said movement, and a remotely located receiver measuring instrument including means for measuring and exhibiting said air pressure.

18. A pneumatic remote telemetering system comprising in combination, a transmitter instrument including an element adapted to deflect into different positions in accordance with variations in a variable quantity, exhibiting means controlled by said element for exhibiting the value of the variable quantity, means adapted to maintain an air pressure varying in predetermined accordance with the deflection of said element and comprising valve means forming a continuous variable bleed to atmosphere, a fixed restriction through which air is supplied at a constant pressure to said valve means, connections between said element and valve means to adjust said valve means by said element to change said pressure accordingly as said element deflects, an expansible chamber device subjected to said pressure and adapted to expand and contract independently of said element as said pressure changes and connections between said device and valve means to adjust said valve means on each such expansion or contraction in a direction tending to neutralize the change in said pressure giving rise to said movement, a receiver measuring instrument located at a distance from the transmitter instrument comprising pressure measuring means and exhibiting means operated thereby, and pressure transmitting means for subjecting said pressure measuring means to said air pressure whereby the value of the variable quantity is exhibited by said receiver measuring instrument.

19. A pneumatic remote telemetering system comprising in combination, a transmitter instrument including an element adapted to deflect into different positions in accordance with variations in a variable quantity, means adapted to maintain an air pressure varying in predetermined accordance with the deflection of said element and comprising valve means including a pair of cooperating valve elements for controlling said pressure, mechanical connections between said element and one of the valve elements to adjust the valve means by said element to change said pressure accordingly as said element deflects, an expansible chamber device subject to said pressure and adapted to expand and contract independently of said element as said pressure changes, mechanical connections between said device and the other valve element to adjust said valve means on each such expansion or contraction in a direction tending to neutralize the change in said pressure giving rise to said movement, and a remotely located receiver measuring instrument including means for measuring and exhibiting said air pressure.

20. A pneumatic remote telemetering system comprising in combination, a transmitter instrument including an element adapted to deflect into different positions in accordance with variations in a variable quantity, means adapted to maintain an air pressure varying in predetermined accordance with the deflection of said element and comprising valve means including a pair of cooperating valve elements forming a continuous bleed to atmosphere, a fixed restriction through which air is supplied at a constant pressure to said valve means, mechanical connections between said element and one of the valve elements to adjust the valve means by said element to change said pressure accordingly as said element deflects, an expansible chamber device subject to said pressure and adapted to expand and contract independently of said element as said pressure changes, mechanical connections between said device and the other valve element to adjust said valve means on each such expansion or contraction in a direction tending to neutralize the change in said pressure giving rise to said movement, and a remotely located receiver measuring instrument including means for measuring and exhibiting said air pressure.

21. A pneumatic remote telemetering system comprising in combination, a transmitter instrument including an element adapted to deflect into different positions in accordance with variations in a variable quantity, means adapted to maintain an air pressure varying in predetermined accordance with the deflection of said element and comprising valve means including a movable flapper and a relatively stationary nozzle forming a continuous bleed to atmosphere, a fixed restriction through which air is supplied at a constant pressure to said valve means, connections between said element and the flapper to adjust the valve means by said element to change said pressure accordingly as said element deflects, an expansible chamber device subject to said pressure and adapted to expand and contract independently of said element as said pressure changes, connections between said device and the flapper to adjust said valve means on each such expansion or contraction in a direction tending to neutralize the change in said pressure giving rise to said movement, and a remotely located receiver measuring instrument including means for measuring and exhibiting said air pressure.

22. A pneumatic remote telemetering system comprising in combination, a transmitter instrument including an element adapted to deflect into different positions in accordance with variations in a variable quantity, means adapted to maintain an air pressure varying in predetermined accordance with the deflection of said element and comprising a pilot valve including an expansible chamber and a valve device operated thereby for regulating said pressure, valve means forming a continuous variable bleed to atmosphere, a fixed restriction through which air is supplied at a constant pressure to said valve means and said expansible chamber for regulating said pressure in accordance with the operation of the valve means, connections between said element and valve means to adjust said valve means by said element to change said pressure accordingly as said element deflects, an expansible chamber device subjected to said pressure and adapted to expand and contract independently of said element as said pressure changes and connections between said expansible chamber device and valve means to adjust said valve means on each such expansion or contraction in a direction to neutralize the change in said pressure giving rise to said movement, and a remotely located receiver measuring instrument including means for measuring and exhibiting said air pressure.

COLEMAN B. MOORE.